(12) United States Patent
Remele et al.

(10) Patent No.: US 10,997,282 B2
(45) Date of Patent: May 4, 2021

(54) METHOD FOR TRIGGERING A SECURITY-RELEVANT FUNCTION OF A SYSTEM, AND SYSTEM

(71) Applicant: VOLKSWAGEN AKTIENGESELLSCHAFT, Wolfsburg (DE)

(72) Inventors: Juri Remele, Rühen (DE); Mirko Mrowczynski, Adenbüttel (DE); Hendrik Frank, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 108 days.

(21) Appl. No.: 15/773,612

(22) PCT Filed: Oct. 25, 2016

(86) PCT No.: PCT/EP2016/075618
§ 371 (c)(1),
(2) Date: May 4, 2018

(87) PCT Pub. No.: WO2017/080810
PCT Pub. Date: May 18, 2017

(65) Prior Publication Data
US 2019/0080076 A1    Mar. 14, 2019

(30) Foreign Application Priority Data
Nov. 11, 2015   (DE) ............ 10 2015 222 234.9

(51) Int. Cl.
*G06F 21/36* (2013.01)
*G06F 3/0488* (2013.01)
(Continued)

(52) U.S. Cl.
CPC .......... *G06F 21/36* (2013.01); *G06F 3/04883* (2013.01); *G06F 21/83* (2013.01);
(Continued)

(58) Field of Classification Search
CPC ...... G06F 21/36; G06F 21/83; G06F 3/04883; G06F 2221/2103; G06F 2221/2133;
(Continued)

(56) References Cited

U.S. PATENT DOCUMENTS 6,617,961 B1 *  9/2003  Janssen ............... B60R 25/245
                                                   307/10.1
6,700,476 B1 *  3/2004  Okada .................... B60R 25/04
                                                   340/12.51
(Continued)

FOREIGN PATENT DOCUMENTS

DE   102011090135 A1   1/2013
DE   102013021594 A1   8/2014
(Continued)

OTHER PUBLICATIONS

IP.com Search Query; May 28, 2020 (Year: 2020).*
(Continued)

*Primary Examiner* — Samson B Lemma
*Assistant Examiner* — Blake I Narramore
(74) *Attorney, Agent, or Firm* — Barnes & Thornburg LLP

(57) ABSTRACT

A method for triggering a security-relevant function of a system by a terminal including generating or selecting an input pattern by the system; inputting a request to carry out the function by the terminal; transmitting the input pattern to the terminal; displaying the input pattern on a display and user interface of the terminal, which pattern must be input by a user; capturing and storing an input by a user on the display and user interface by the terminal; transmitting the captured
(Continued)

and stored input from the terminal to the system; receiving the captured and stored input by the system; comparing the received input with the transmitted input pattern in the system; and carrying out the function by the system in response to the received input matching the input pattern within a predefined extent. Also disclosed is an associated system.

10 Claims, 3 Drawing Sheets

(51) Int. Cl.
| | | |
|---|---|---|
| H04L 29/06 | (2006.01) | |
| G06F 21/83 | (2013.01) | |
| H04W 12/06 | (2021.01) | |
| H04W 12/08 | (2021.01) | |
| H04L 29/08 | (2006.01) | |

(52) U.S. Cl.
CPC ............ *H04L 63/10* (2013.01); *H04W 12/06* (2013.01); *H04W 12/08* (2013.01); *G06F 2221/2103* (2013.01); *G06F 2221/2133* (2013.01); *H04L 67/12* (2013.01)

(58) Field of Classification Search
CPC ........ H04L 63/10; H04L 67/12; H04W 12/06; H04W 12/08
See application file for complete search history.

(56) References Cited

U.S. PATENT DOCUMENTS

| | | | | |
|---|---|---|---|---|
| 8,049,631 | B1* | 11/2011 | Edwards | B60K 28/063 |
| | | | | 340/576 |
| 10,187,793 | B2* | 1/2019 | Petel | H04L 63/0492 |
| 2009/0150991 | A1* | 6/2009 | Hoey | H04L 63/0807 |
| | | | | 726/18 |
| 2012/0252415 | A1* | 10/2012 | Menzel | H04L 63/083 |
| | | | | 455/411 |
| 2012/0254960 | A1* | 10/2012 | Lortz | H04L 63/104 |
| | | | | 726/7 |
| 2013/0028339 | A1* | 1/2013 | Schmidt | G06F 21/445 |
| | | | | 375/259 |
| 2015/0095997 | A1* | 4/2015 | Mabuchi | H04L 63/08 |
| | | | | 726/6 |
| 2015/0161244 | A1* | 6/2015 | Guan | G06F 3/04883 |
| | | | | 707/749 |
| 2015/0339334 | A1* | 11/2015 | Hanke | H04L 67/306 |
| | | | | 707/736 |
| 2016/0173568 | A1* | 6/2016 | Penilla | H04L 67/10 |
| | | | | 709/217 |
| 2016/0225203 | A1* | 8/2016 | Asmar | G07C 9/00309 |
| 2016/0297398 | A1* | 10/2016 | Jefferies | G07B 15/00 |

FOREIGN PATENT DOCUMENTS

| | | |
|---|---|---|
| DE | 202014103258 U1 | 12/2014 |
| DE | 102013012394 A1 | 1/2015 |
| KR | 20130026331 A | 3/2013 |
| KR | 101553482 B1 | 9/2015 |
| WO | 2015074425 A1 | 5/2015 |

OTHER PUBLICATIONS

Search Report for German Patent Application No. 10 2015 222 234.9; dated Sep. 20, 2016.
Search Report for International Patent Application No. PCT/EP2016/075618; dated Jan. 20, 2017.

* cited by examiner

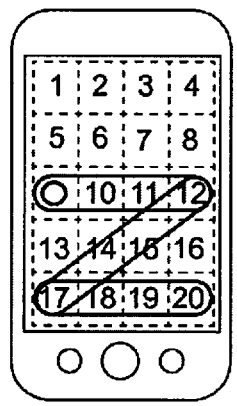
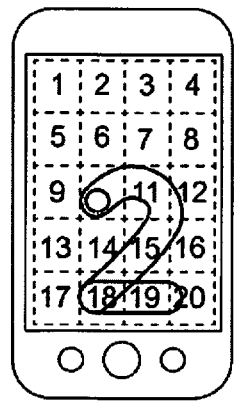
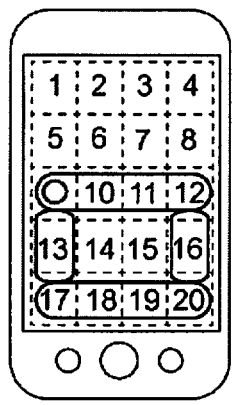
FIG. 4a  FIG. 4b  FIG. 4c
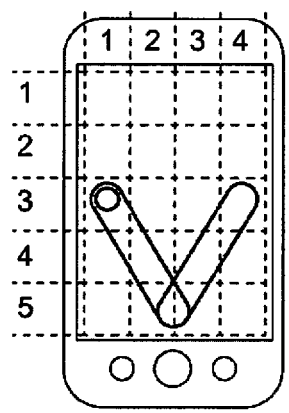
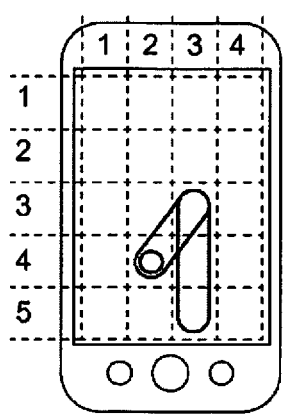
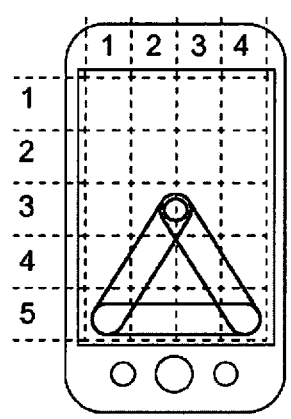
FIG. 5a  FIG. 5b  FIG. 5c

METHOD FOR TRIGGERING A SECURITY-RELEVANT FUNCTION OF A SYSTEM, AND SYSTEM

PRIORITY CLAIM

This patent application is a U.S. National Phase of International Patent Application No. PCT/EP2016/075618, filed 25 Oct. 2016, which claims priority to German Patent Application No. 10 2015 222 234.9, filed 11 Nov. 2015, the disclosures of which are incorporated herein by reference in their entireties.

SUMMARY

Illustrative embodiments relate to a method for triggering a security-relevant function of system by a terminal, and such a system.

BRIEF DESCRIPTION OF THE DRAWINGS

The disclosed embodiments are explained below in more detail with reference to the figures, in which:

FIGS. 4a-c show various illustrations of input patterns with a display and user interface divided into segments; and FIGS. 5a-c show various illustrations of input patterns represented as coordinates.

DETAILED DESCRIPTION

Figure 1:
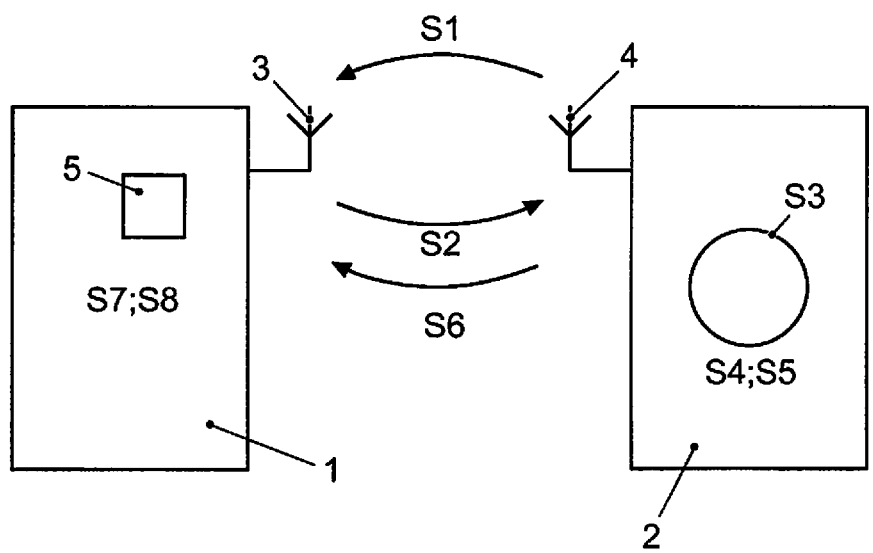
FIG. 1 shows a schematic illustration of a method sequence in a first embodiment.

A mobile terminal is known from DE 20 2014 103 258 U1, comprising a display unit which can switch between a deactivated state in which no illumination is applied to the display unit and an activated state in which illumination is applied to the display unit. The mobile terminal further comprises a control unit which is designed in such a way as to release a locked state of the mobile terminal and switch the display unit into the activated state when a contact pattern has been input in the deactivated state of the display unit and the contact pattern that has been input matches one of at least one predetermined pattern. The mobile terminal, when the display unit is in the deactivated state and/or the mobile terminal is in the locked state, is here able to carry out a sleep mode in which contact inputs are recognizable at a lower rate than in the activated state of the display unit. The contact pattern can here be a touch pattern that comprises a plurality of sequential contact inputs which can form a pattern if they are linked in their sequential order. Alternatively, the movement pattern can comprise a continuous movement input, i.e., a movement path or movement track.

A method for a security-relevant input through a display device with contact input, in particular, through a touchscreen, is known from DE 10 2011 090 135 A1, wherein the method comprises the following method operations:

transmitting image data via an image data line from a computing unit to a display device with a capture component for capturing different contact inputs at the display;

determining a contact input through reading the capture component;

reading of the capture component of the display device or an additional capture component for the selection of a monitoring region by a checking unit connected to the image data line, wherein the monitoring region corresponds to the partial region within which the contact input that was determined took place;

creating a check code in the checking unit for that part of the image data that is provided for display in the monitoring region; and outputting or reading the check code created by the checking unit, in particular, for the purpose of instigating a security-relevant reaction.

It can hereby be ensured at display devices with contact input that precisely the actuation or input that was in fact truly carried out by the user is recognized, optionally even independently of whereabouts within the display this has taken place.

The disclosed embodiments are based on the technical problem of making a method available for triggering a security-relevant function of a system by a terminal, in which method a deliberate human request for the function is checkable, as well as creating a suitable system.

The solution to the technical problem is achieved by the disclosed method and the disclosed system.

For this purpose, the method comprises the following method operations:

generation or selection of an input pattern by the system. Optionally, the selection of the input pattern is made here from a number of predetermined input patterns by a random generator. The input patterns can here be touch patterns or continuous patterns, in particular, geometric forms or numbers.

inputting of a request for carrying out the function by the terminal.

It is to be noted here that the sequence of these two method operations can also be reversed, i.e., the system only generates or selects the input pattern when a request is placed.

The input pattern is transmitted to the terminal.

The input pattern that a user must enter is displayed on a display and user interface of the terminal. The input can be made here by a finger in the case of a touchscreen surface, or by a mouse or a similar input element in the case of a conventional display unit.

The input of the user on the display and user interface is captured and stored by the terminal.

The captured and stored input from the terminal is transmitted to the system and received by it.

The system compares the transmitted input pattern with the received input, wherein the system carries out the function if the received input matches the input pattern to a predefined extent.

Since the input of the input pattern involves a certain complexity, the possibility that an unintentional input by a user is involved is reliably avoided, and the possibility that a human is not involved is excluded. The input pattern thus at the same time represents a "captcha".

The communication between the system and the terminal here may be wireless. The terminal can, for example, be a smartphone, a PC or another terminal suitable for remotely controlling a system. The system can, for example, be a robot installation, a medical installation or the like, wherein, in at least one disclosed embodiment, the system is a motorized transportation vehicle, wherein the security-relevant function is, for example, the initiation of an automated journey or an automated parking procedure, or a switching on of a motor for air-conditioning purposes.

In a further disclosed embodiment, the input of a request for carrying out the function is conveyed directly from the terminal to the system, and the input pattern is transmitted directly from the system to the terminal. In this disclosed embodiment, no further components are required with the exception of the infrastructure for wireless communication.

In another disclosed embodiment, the system therefore conveys the input pattern in advance to a server, wherein the request for carrying out the function is conveyed from the terminal to the server, which then conveys the input pattern to the terminal. Since the data transmission between a terminal and such a server is usually faster than between the terminal and the system (e.g., motorized transportation vehicle), the triggering is thus accelerated, while the checking nevertheless remains in the system.

In a further disclosed embodiment, an identifier is transmitted with the input pattern, and the terminal transmits the identifier with the captured and stored input to the system. The identifier here may be a consecutive identifier. In the case, in particular, of multi-user operation, this represents a further security measure. If a user has, for example, already made an input with the identifier, the system generates or selects a new input pattern with a new identifier. The system can in this way securely establish that the received input in each case also relates to the current input pattern.

In a further disclosed embodiment, the input is captured and stored as a coordinate sequence (e.g., X and Y coordinates) or a segment sequence.

With regard to the design of the system, reference is made in full to the preceding explanations.

A first exemplary embodiment for triggering a security-relevant function of a system 1 by a terminal 2 is illustrated in FIG. 1. Both the system 1 and the terminal 2 have a radio interface 3, 4, through which they communicate with one another (for example, by BLUETOOTH®). The system 1 has a memory 5 in which various input patterns are stored. The system 1 is, for example, a motorized transportation vehicle, and the terminal 2 is a smartphone.

Figure 3:
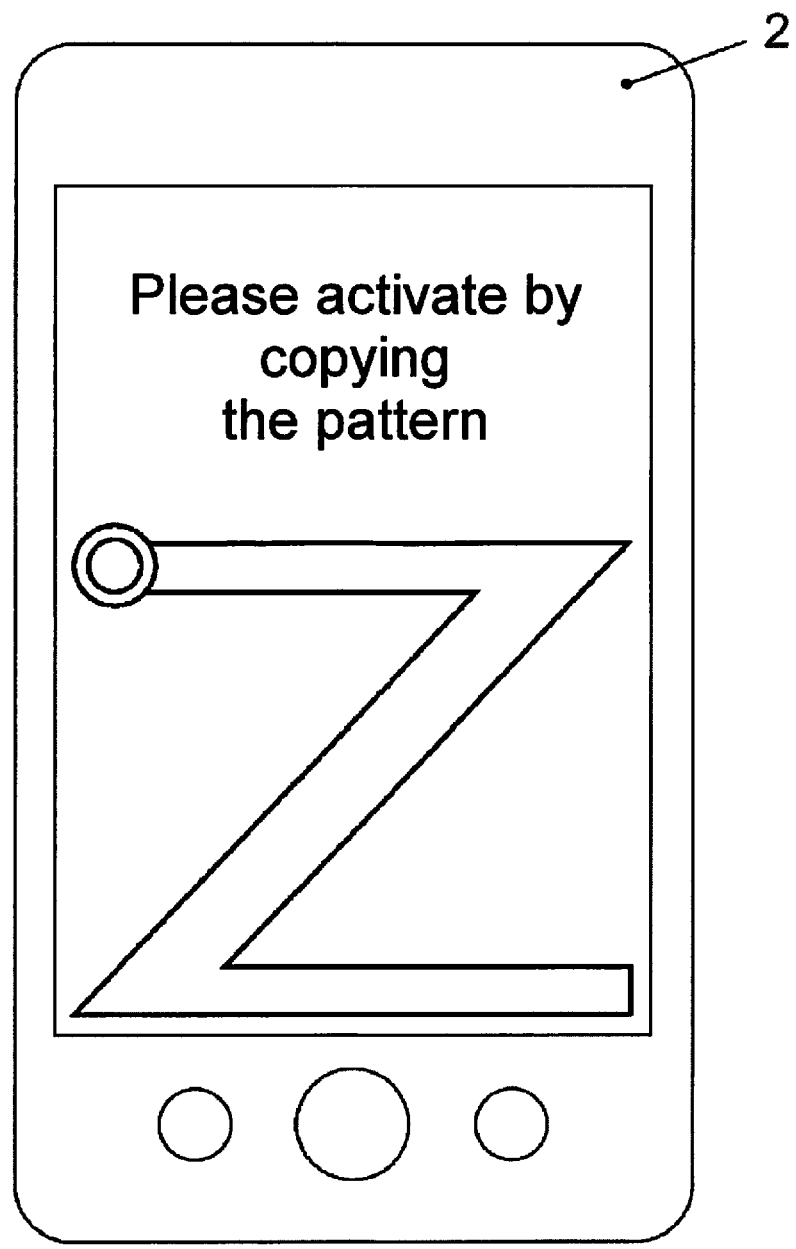
FIG. 3 shows an exemplary illustration of an input pattern on a terminal.

If a user now wants to execute a security-relevant function through the system 1 by the terminal 2, the user enters a request for carrying out the function into the terminal 2, which request is then transmitted to the system 1 (method operation at S1). The system 1 receives this request, and selects, by a random generator, an input pattern from a plurality of input patterns which are stored in the memory 5. In a method operation at S2, the system 1 transmits the selected input pattern, possibly with a consecutive identifier, to the terminal 2. The transmitted input pattern here is stored temporarily in the system 1. It can be provided here that the transmitted input pattern only remains valid for a predetermined time. The terminal 2 receives the input pattern, and displays it on a display and user interface (method operation at S3). The input pattern is a circle in the illustrated example according to FIG. 1. The user is requested here to draw a copy of the displayed input pattern, as is illustrated by way of example in FIG. 3. In a method operation at S4, the user then draws a copy of the input pattern, and this is captured and stored by the terminal 2 (method operation at S5).

The captured and stored input is transmitted in a method operation at S6 to the system 1 (potentially together with the conveyed identifier). In a method operation at S7, the system 1 checks the received input and compares it with the input pattern. If the input pattern and the input match, the function is carried out by the system 1 (method operation at S8).

Figure 2:
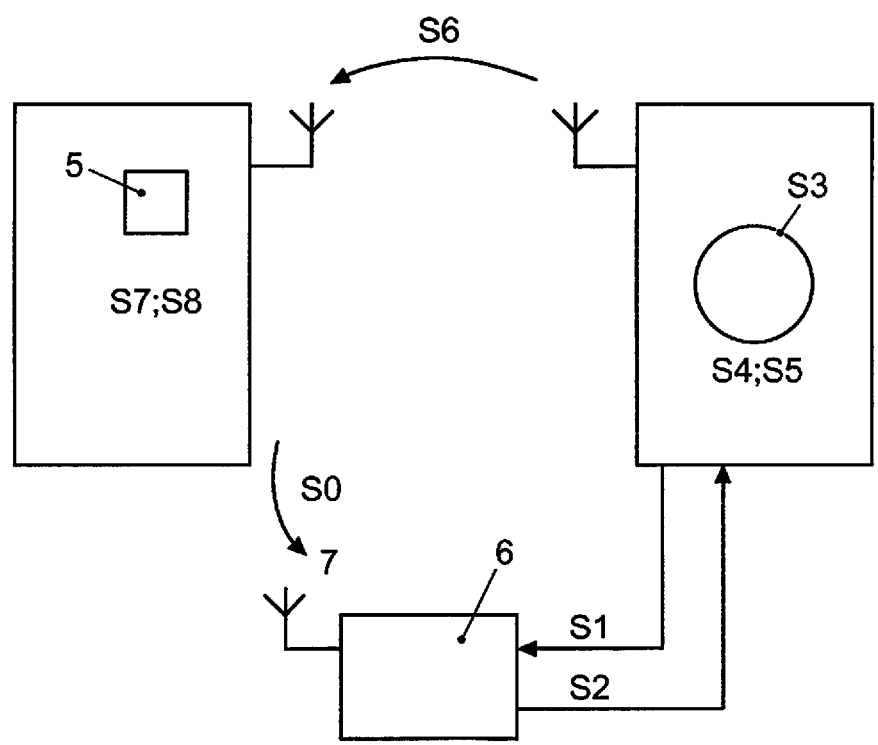
FIG. 2 shows a schematic illustration of a method sequence in a second embodiment.

An alternative disclosed embodiment with a server 6 connected interposed is illustrated in FIG. 2. The server 6 here comprises a radio interface 7. In an upstream method operation at S0 the system 1 transmits an input pattern to the server 6. In contrast to the method according to FIG. 1, the request to carry out the function (method operation at S1) is not made directly to the system 1, but to the server 6, which then conveys the input pattern to the terminal 2, whereupon the further method operations at S3 to S8 proceed as described previously. The data connection (whether wireless or wired) between the terminal 2 and the server 6 can be very fast, so that the method sequence overall is accelerated.

A brief explanation will now be given with reference to FIG. 4a-c and FIG. 5a-c as to how the transmission of the input to the system can take place. The input patterns here can be letters, numbers or geometric figures. The display and user interface of the terminal 2 according to FIG. 4a-c here represents a virtual keypad, the display and user interface being divided into segments 1-20. The display and user interface in FIG. 5a-c is similarly divided into X and Y coordinates. The associated expected inputs as segments or coordinates when the drawing is copied are shown in the following tables for the input patterns in FIG. 4a-c and FIG. 5a-c respectively.

| Pattern no. | Pattern |
|---|---|
| 1 | 9/10/11/12/13/14/15/17/18/19/20 |
| 2 | 10/11/12/15/16/18/19/20 |
| 3 | 9/10/11/12/16/20/19/18/17/13 |
| 4 | . . . |
| | XY-axis pattern |
| 1 | 13/14/24/25/35/34/44/43 |
| 2 | 24/32/33/34/35 |
| 3 | 23/33/34/45/35/25/15/14/24 |
| 4 | . . . |

Touching the segments 10, 11, 12, 15, 16, 18, 19, 20 in this sequence is thus expected for the 2 illustrated in FIG. 4b. As can be seen, it is, for example, possible here that segment 16 is touched before segment 15. It can therefore be provided that the function is also executed if a sufficiently high match exists between the input in the terminal 2 and the stored segments or coordinates in the system.

The invention claimed is:

1. A method for triggering a security-relevant function of a transportation vehicle using a terminal that is remote from the transportation vehicle, the method comprising:

generating or selecting an input pattern by the transportation vehicle;

transmitting the input pattern from the transportation vehicle to a server that is remote from the transportation vehicle;

receiving input of a request for carrying out the security-relevant function at the remote terminal;

transmitting the security-relevant function request from the remote terminal to the remote server;

transmitting, by the remote server, the input pattern to the remote terminal in response to receiving the security-relevant function request;

displaying the input pattern on the remote terminal with instructions for a user to enter the input pattern using a user interface of the terminal to signify authorization to trigger the security-relevant function;

capturing and storing user input using the user interface by the terminal;

transmitting the captured and stored user input from the remote terminal to the transportation vehicle;

receiving the user input transmitted by the remote terminal at the transportation vehicle;

comparing, at the transportation vehicle, the user input received from the remote terminal with the input pattern previously transmitted by the transportation vehicle; and performing the security-relevant function by the transportation vehicle in response to a determination that the user input matches the transportation vehicle's generated input pattern to a predefined extent.

2. The method of claim 1, wherein an identifier is transmitted with the input pattern to the remote terminal, the remote terminal transmits the identifier with the user input to the transportation vehicle, and the transportation vehicle generates or selects another input pattern in response to the identifier matching a previous identifier transmitted from the remote terminal to the transportation vehicle.

3. The method of claim 1, wherein the user input is captured and stored as a coordinate sequence or a segment sequence.

4. The method of claim 1, wherein the transportation vehicle further includes a memory storing a plurality of input patterns, and the input pattern is selected from the plurality of input patterns stored in the memory.

5. The method of claim 4, wherein the input pattern is selected by a random generator.

6. A system for triggering a security-relevant function of a transportation vehicle, the system comprising at least one terminal interface for communication with a terminal that is remote from the transportation vehicle and at least one server interface for communication with a server that is remote from the transportation vehicle, wherein a non-transitory computer-readable storage medium of the system has instructions that, when executed by a computer, prompt the system to perform the following:

generate or select an input pattern by the transportation vehicle;

transmit the input pattern from the transportation vehicle to the remote server;

receive input of a request for carrying out the security-relevant function at the remote terminal;

transmit the security-relevant function request from the remote terminal to the remote server;

transmit, by the remote server, the input pattern to the remote terminal in response to receiving the security-relevant function request;

display the input pattern on the remote terminal with instructions for a user to enter the input pattern using a user interface of the terminal to signify authorization to trigger the security-relevant function;

capture and storing user input using the user interface by the terminal;

transmit the captured and stored user input from the remote terminal to the transportation vehicle;

receive the user input transmitted by the remote terminal at the transportation vehicle;

compare, at the transportation vehicle, the user input received from the remote terminal with the input pattern previously transmitted by the transportation vehicle; and perform the security-relevant function by the transportation vehicle in response to a determination that the user input matches the transportation vehicle's generated input pattern to a predefined extent.

7. The system of claim 6, wherein an identifier is transmitted with the input pattern to the remote terminal, the remote terminal transmits the identifier with the user input to the transportation vehicle, and the transportation vehicle generates or selects another input pattern in response to the identifier matching a previous identifier received from the remote terminal to the transportation vehicle.

8. The system of claim 6, wherein the user input of the terminal is received by the system as a coordinate sequence or a segment sequence.

9. The system of claim 6, wherein the transportation vehicle further includes a memory storing a plurality of input patterns, and the input pattern is selected from the plurality of input patterns stored in the memory.

10. The system of claim 9, wherein the input pattern is selected by a random generator.

\* \* \* \* \*